Sept. 13, 1938.　　　D. M. LIGHT　　　2,130,141
SPRING PLANK
Filed Nov. 22, 1933　　　4 Sheets-Sheet 1
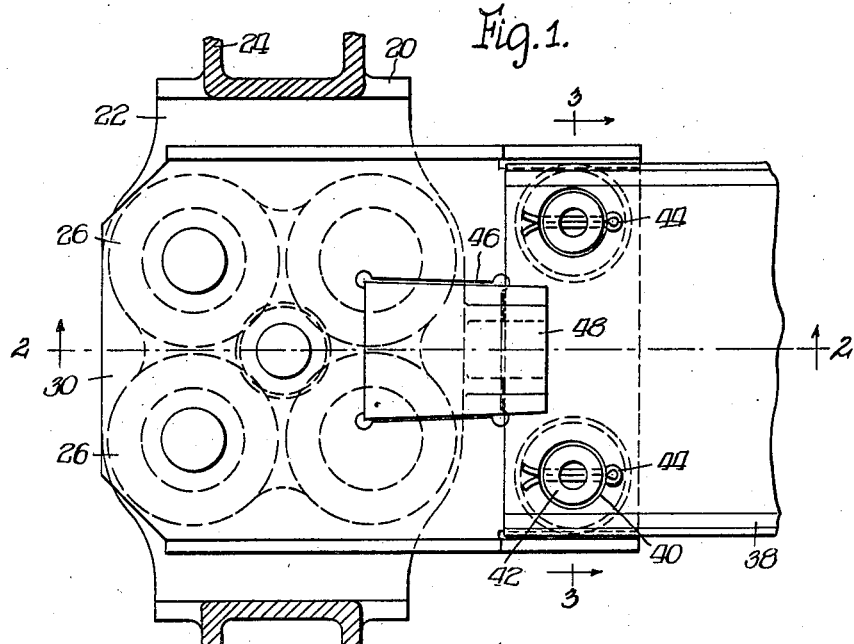
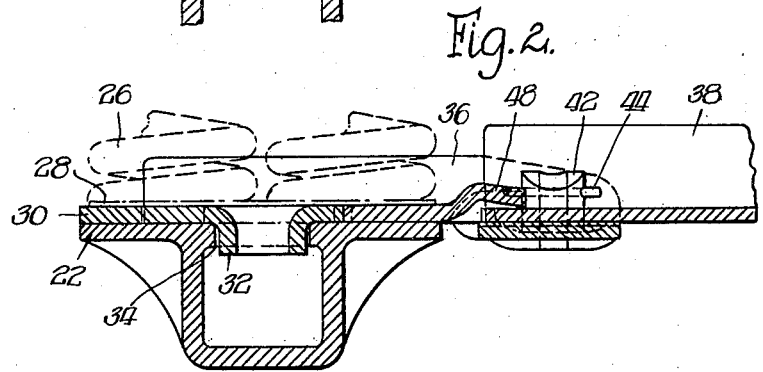
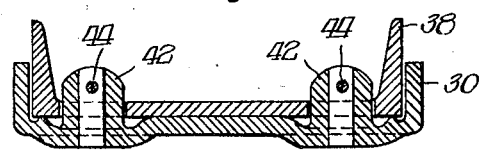
Inventor
David M. Light.

Sept. 13, 1938. D. M. LIGHT 2,130,141
SPRING PLANK
Filed Nov. 22, 1933 4 Sheets-Sheet 2

Inventor
David M. Light
By Wilkinson, Huxley, Byron & Knight
Attys

Sept. 13, 1938.   D. M. LIGHT   2,130,141
SPRING PLANK
Filed Nov. 22, 1933   4 Sheets-Sheet 3

Inventor:
David M. Light,
By Wilkinson, Huxley, Byron & Knight
Attys.

Sept. 13, 1938. D. M. LIGHT 2,130,141
SPRING PLANK
Filed Nov. 22, 1933 4 Sheets-Sheet 4
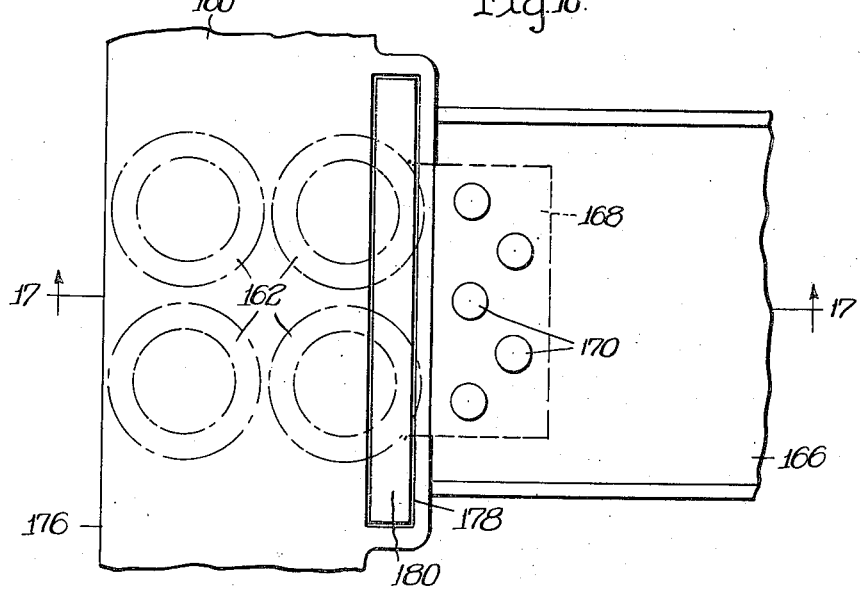
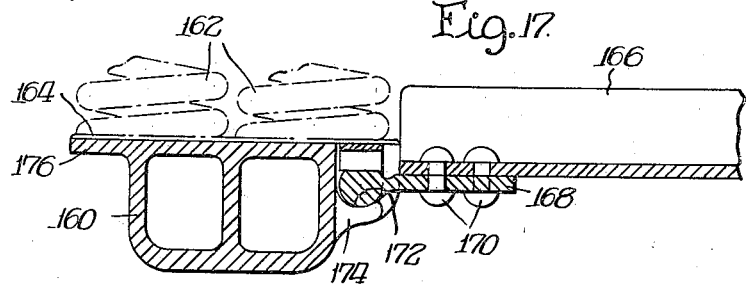
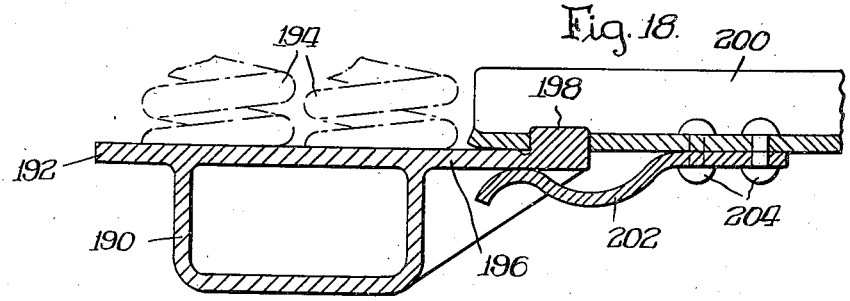
Inventor:
David M. Light, Patented Sept. 13, 1938

2,130,141

UNITED STATES PATENT OFFICE 2,130,141

SPRING PLANK

David M. Light, Evanston, Ill., assignor to American Steel Foundries, Chicago, Ill., a corporation of New Jersey Application November 22, 1933, Serial No. 699,098

15 Claims. (Cl. 105—208.2)

This invention pertains to spring planks.

In some types of car trucks difficulty has been experienced due to breakage of spring planks, particularly since the adoption of higher speeds by railroads. The principal reason for this is the rigidity of the truck due to fixedly securing a spring plank to the opposite side frames.

It is therefore an object of this invention to provide a flexible spring plank arrangement for a railway vehicle truck.

Another object is to provide a light spring plank for tying the spaced side frames of a truck by flexibly connecting said side frames.

A further object is to provide a short spring plank adapted to flexibly tie the spaced side frames of a truck together by means of an intermediate adapter interposed between the side frames and the spring plank.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary sectional top plan view through the spaced columns of a truck showing the application of a spring plank embodying the invention to the spring seat of said truck;

Figure 2 is a sectional elevation taken substantially in the plane as indicated by the line 2—2 of Figure 1;

Figure 3 is a transverse elevation taken substantially in the plane as indicated by the line 3—3 of Figure 1;

Figure 16 is a still further modification of a spring plank embodying the invention;

Figure 17 is a sectional elevation taken substantially in the plane as indicated by the line 17—17 of Figure 16;

Figure 18 is a sectional elevation of a different modified form of spring plank embodying the invention.

Figure 4:
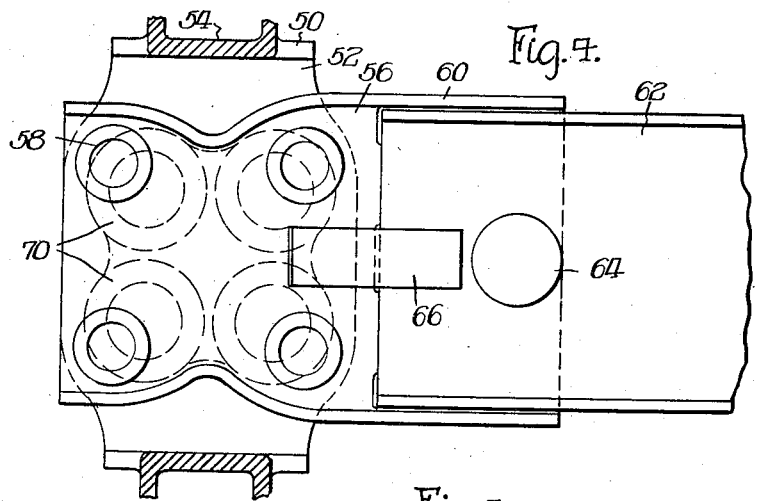
Figure 4 is a fragmentary sectional top plan view corresponding to Figure 1 of a modified form of spring plank connection.

Referring first of all more particularly to the construction illustrated in Figures 1 to 3 inclusive, the side frame 20 may be of the usual truss construction which is conventional in the present side frames, and includes the spring seat 22 and the spaced columns 24. The truck is provided with the spring group 26 provided with the spring plate 28 seated on the adapter 30 which is maintained in proper position on the spring seat 22 by reception of the dowel 32 in a suitable aperture 34 provided in the spring seat.

The adapter is provided with the side flanges 36 and receives the spring plank 38, the spring plank being apertured as at 40 for the reception of the dowels 42 provided on the adapter, suitable cotters 44 securing the spring plank against release from the dowels. The adapter is cut out as at 46 for the reception of the locking tongue 48, which may be resilient, the locking tongue being secured in position by being interposed between the spring plate 28 and the spring seat 22.

Figure 5:
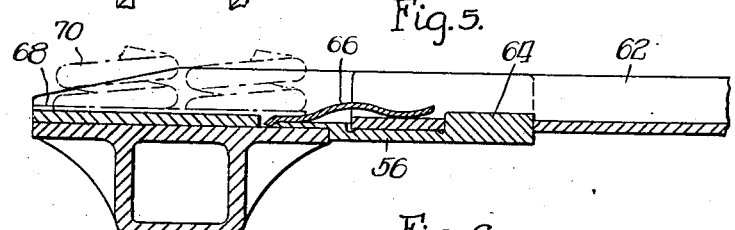
Figure 5 is a fragmentary sectional elevation taken substantially on the center line of the spring plank shown in Figure 4.

The construction illustrated in Figures 4 and 5 is adapted particularly for use with a truck of the Dalman two-level type, the truck side frame 50 being provided with the spring seat 42 and the spaced columns 54. The adapter 56 is positioned on the spring seat 52 by means of the dowels 58 and is provided with the upstanding flanges 60 for reception of the spring plank 62, said spring plank being positioned by means of the dowel 64 provided on the adapter and extending upwardly through an aperture provided in said spring plank. The resilient tongue or member 66 engages the spring plank adjacent one end thereof, the opposite end being fixed by insertion between the adapter and the spring plate 68 of the spring group 70.

Figure 6:
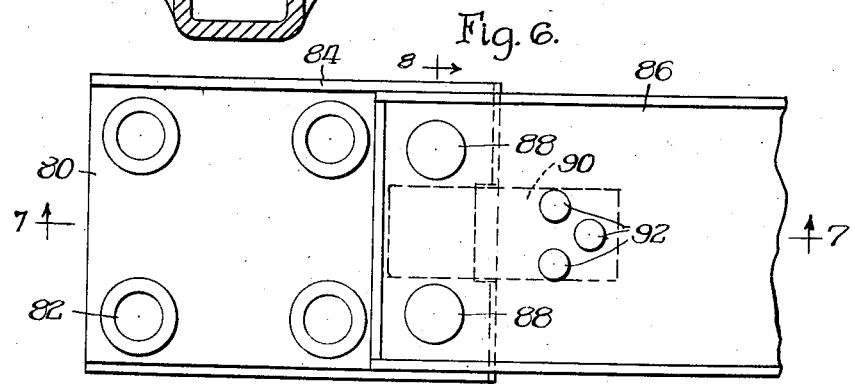
Figure 6 is a fragmentary top plan view of another modified form of spring plank and adapter.
Figure 7:
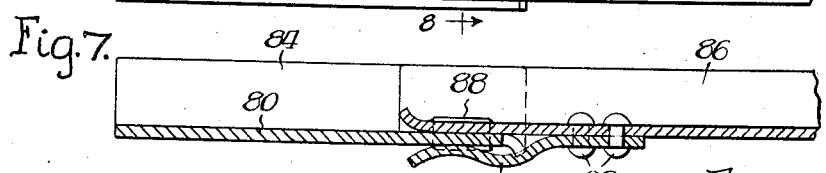
Figure 7 is a fragmentary sectional elevation taken substantially in the plane as indicated by the line 7—7 of Figure 6.
Figures 8, 9:
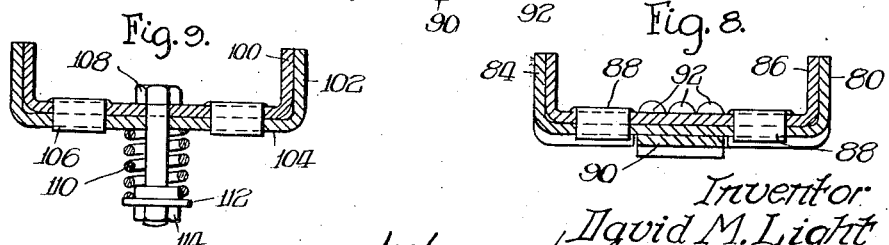
Figure 8 is a transverse sectional elevation taken substantially in the plane as indicated by the line 8—8 of Figure 6.
Figure 9 is a transverse sectional elevation corresponding to Figure 8 showing a modified form of resilient connection between the spring plank and adapter.

In the construction illustrated in Figures 6 to 8 inclusive, the adapter 80 is provided with the positioning means 82 and the side flanges 84 for the reception of the spring plank 86. The spring plank is positioned on the adapter by the reception of the dowels 88 in suitable apertures in the adapter, a flat spring 90 being riveted onto the spring plank as at 92 and resiliently engaging the under side of the adapter for retaining the spring plank in engagement with the ledge of the adapter.

In the connection illustrated in Figure 9, the spring plank 100 is received between the upstanding flanges 102 of the adapter 104 and positioned thereon by means of the dowels 106 which may be carried by either the spring plank or the adapter, the resilient connection between the spring plank and adapter taking the form of the bolt 108 extending through suitable aligned apertures in the adapter and spring plank, the coil spring 110 being disposed between the adapter and a washer 112 retained on the bolt by means of the nut 114.

Figure 10:
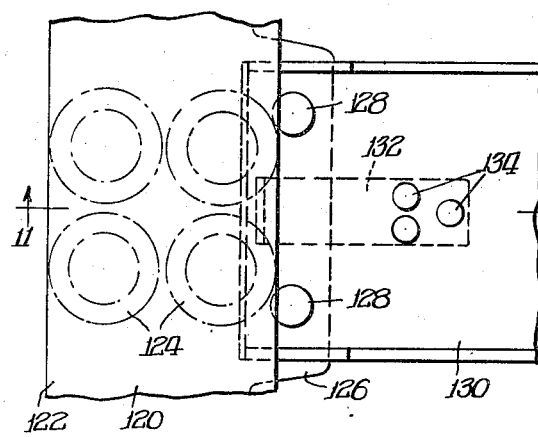
Figure 10 is a fragmentary top plan view of yet another modified form of spring plank connection.
Figure 11:
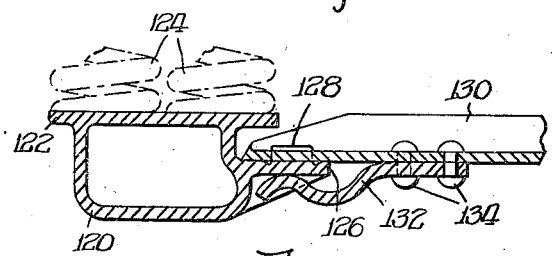
Figure 11 is a fragmentary transverse sectional elevation taken substantially in the plane as indicated by the line 11—11 of Figure 10.

In the construction illustrated in Figures 10 and 11, the side frame 120 is provided with the spring seat 122 for the reception of the spring group 124. A spring plank ledge 126 is disposed below the spring seat 122 and is provided with the spaced upstanding dowels 128 receivable in suitable apertures formed in the spring plank 130. The spring 132 is riveted to the spring plank 130 as at 134 and engages the under side of the ledge 126 for resiliently retaining the spring plank in position with the ledge.

Figure 12:
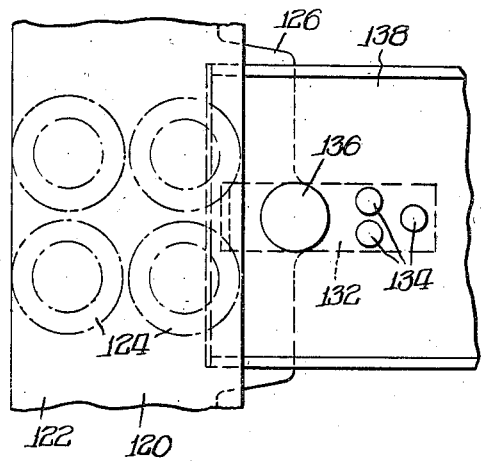
Figure 12 is a fragmentary top plan view of yet another modified form of connection between the spring plank and the side frame.

The modification illustrated in Figure 12 differs from that shown in Figures 10 and 11 only in that the ledge 126 is provided with the single upstanding dowel or boss 136 receivable in the suitable aperture provided in the spring plank 138. As before, the flat spring 132 riveted to the under side of the spring plank as at 134 resiliently engages the under side of the ledge 126.

Figure 13:
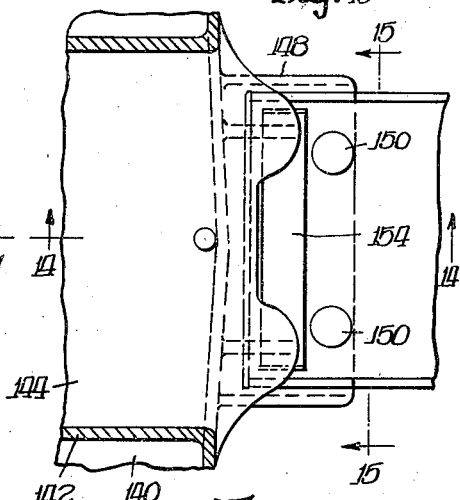
Figure 13 is a fragmentary sectional top plan view of a yet further modified form of connection between the spring plank and side frame.
Figure 14:
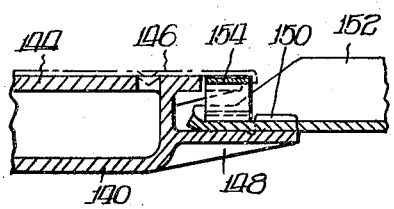
Figure 14 is a fragmentary transverse sectional elevation taken substantially in the plane as indicated by the line 14—14 of Figure 13.
Figure 15:
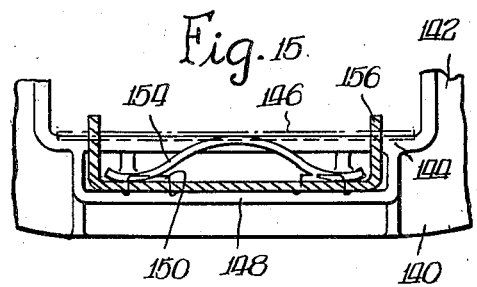
Figure 15 is a transverse sectional elevation taken substantially in the plane as indicated by the line 15—15 of Figure 13.

In the construction illustrated in Figures 13 to 15 inclusive, the truck side frame 140 is provided with the spaced columns 142 and the spring seat 144. The spring group (not shown) is provided with the spring plate 146 supported on the spring seat 144 and extends inwardly beyond said seat. In this construction the side frame is provided with the spring plank ledge 148 provided with spaced dowels 150 adapted to position the spring plank 152 by engagement in suitable apertures formed therein. In this case the bowed spring 154 is sprung into position between the spring plate and the spring plank.

In the construction illustrated in Figures 16 and 17, the side frame 160 is provided with the coil spring group 162 having the spring plate 164. The spring plank 166 is provided with the adapter 168 riveted thereto as at 170, said adapter being provided with the bearing 172 receivable in a suitable socket 174 provided on the side frame below the spring seat 176 of the side frame. The spring seat is provided with the cut-out portion 178 and the flat spring 180 is fitted in the socket formed in the side frame and retained between the bearing member 172 and the spring plate for resiliently retaining the spring plank in association with the side frame.

In the construction illustrated in Figure 18, the side frame 190 is provided with the spring seat 192 for the reception of the coil spring group 194. The spring seat portion 192 is provided with the inwardly extending projection or extension 196 having the dowel or dowels 198 receivable in apertures formed in the spring plank 200. The spring plank is provided with the spring 202 riveted to the spring plank as at 204 and resiliently engaging below the projection 196 for associating the spring plank with the side frame.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a truck, the combination of a side frame, resilient means associated with said side frame for supporting a load carrying member, a spring plank supported by said side frame, and vertically acting resilient means having cooperative engagement with said side frame and spring plank to provide a flexible connection therebetween.

2. In a truck, the combination of a side frame, resilient means associated with said side frame for supporting a load carrying member, a spring plank supported by said side frame, means connecting said spring plank and side frame, and vertically acting resilient means having cooperative engagement with said side frame and spring plank to provide a flexible connection therebetween.

3. In a truck, the combination of a side frame, an adapter supported on said side frame, a spring having a spring cap seated on said adapter, a spring plank supported on said adapter, and resilient means interposed between said spring cap and side frame and engaging said spring plank.

4. In a truck, the combination of a side frame, an adapter supported on said side frame, a spring having a spring cap seated on said adapter, a spring plank supported on said adapter, spaced means loosely connecting said adapter and spring plank, and resilient means interposed between said spring cap and side frame and engaging said spring plank.

5. In a truck, the combination of a side frame having a spring seat, a ledge disposed below said seat, a spring plank supported on said ledge, means for loosely interlocking said spring plank to said ledge, and a flat spring secured to said spring plank and engaging said ledge.

6. In a truck, the combination of a side frame having a spring seat, a ledge disposed below said seat, a spring plank supported on said ledge, means for loosely interlocking said spring plank to said ledge, and a flat spring secured to said spring plank and engaging said side frame.

7. In a truck, the combination of a side frame having a spring seat, a ledge disposed below said spring seat, said ledge being provided with a boss, a spring plank interlocking with said boss and supported by said ledge, said spring plank having resilient means secured thereto and engaging said ledge to provide a flexible connection between said spring plank and ledge and to hold the same in said interlocking relationship.

8. In a truck, the combination of a side frame having a spring seat, a ledge disposed below said spring seat, said ledge being provided with a boss, and a spring plank engaging said boss and supported by said ledge, said spring plank having a flat spring secured thereto and engaging the underside of said ledge to provide a flexible connection between said spring plank and ledge and to hold the same in said interlocking relationship.

9. In a truck, the combination of a side frame having a spring seat, said spring seat being provided with a ledge in substantial alignment therewith, said ledge being provided with a boss, a spring plank supported on said ledge and engaging said boss, said spring plank being provided with a flat spring secured thereto and engaging the underside of said ledge.

10. In a truck, a combination of a side frame, an adapter supported on said side frame, a spring plank supported on said adapter, and means providing a vertically flexible connection between said spring plank and adapter, said means substantially preventing horizontal relative movement between said spring plank and side frame.

11. In a truck, the combination of a side frame having a spring seat, said side frame having a laterally disposed extension adjacent said spring seat, a spring plank supported on said extension, means for flexibly connecting said spring plank to said side frame, said means preventing relative horizontal movement of said spring plank with respect to said side frame, and means connected to said spring plank and engaging said extension preventing vertical displacement of said spring plank with respect to said side frame.

12. A spring plank for car trucks having an elongated central rigid portion, end portions adapted to rest on side frames and resilient portions joining the central portion to the end portions.

13. A spring plank for car trucks, said spring plank having an elongated central rigid portion, end portions adapted to rest on the side frames of said truck, and resilient portions joining the central portion to the end portions, said end portions being provided with means for engaging the side frames, said means being so constructed and arranged that substantial lateral motion between the spring plank and side frames is prevented, said means including deformations in said end portions adapted to engage means on said side frames.

14. A spring plank for car trucks having an elongated central rigid portion and end portions adapted to rest on spaced side frames of said truck, resilient portions adjacent said end portions permitting relative movement of a portion of said spring plank with respect to said side frames, said spring plank and side frames being provided with interengaging means so constructed and arranged that substantial lateral movement between said spring plank and side frames is prevented, said means including a dowel and opening connection.

15. A spring plank for car trucks, said spring plank having an elongated central rigid portion, end portions adapted to rest on the side frames of said truck, resilient portions joining the central portion to the end portions, said end portions being provided with means for engaging the side frames, said means being so constructed and arranged that substantial lateral motion between the spring plank and side frames is prevented, said means including deformations in said end portions adapted to engage means on said side frames, and means including a dowel and opening connection.

DAVID M. LIGHT.